Oct. 10, 1933.  A. W. MALONE  1,929,700
BRACKET FOR RESILIENTLY SUPPORTING ELECTRIC CABLES
Filed Nov. 14, 1931
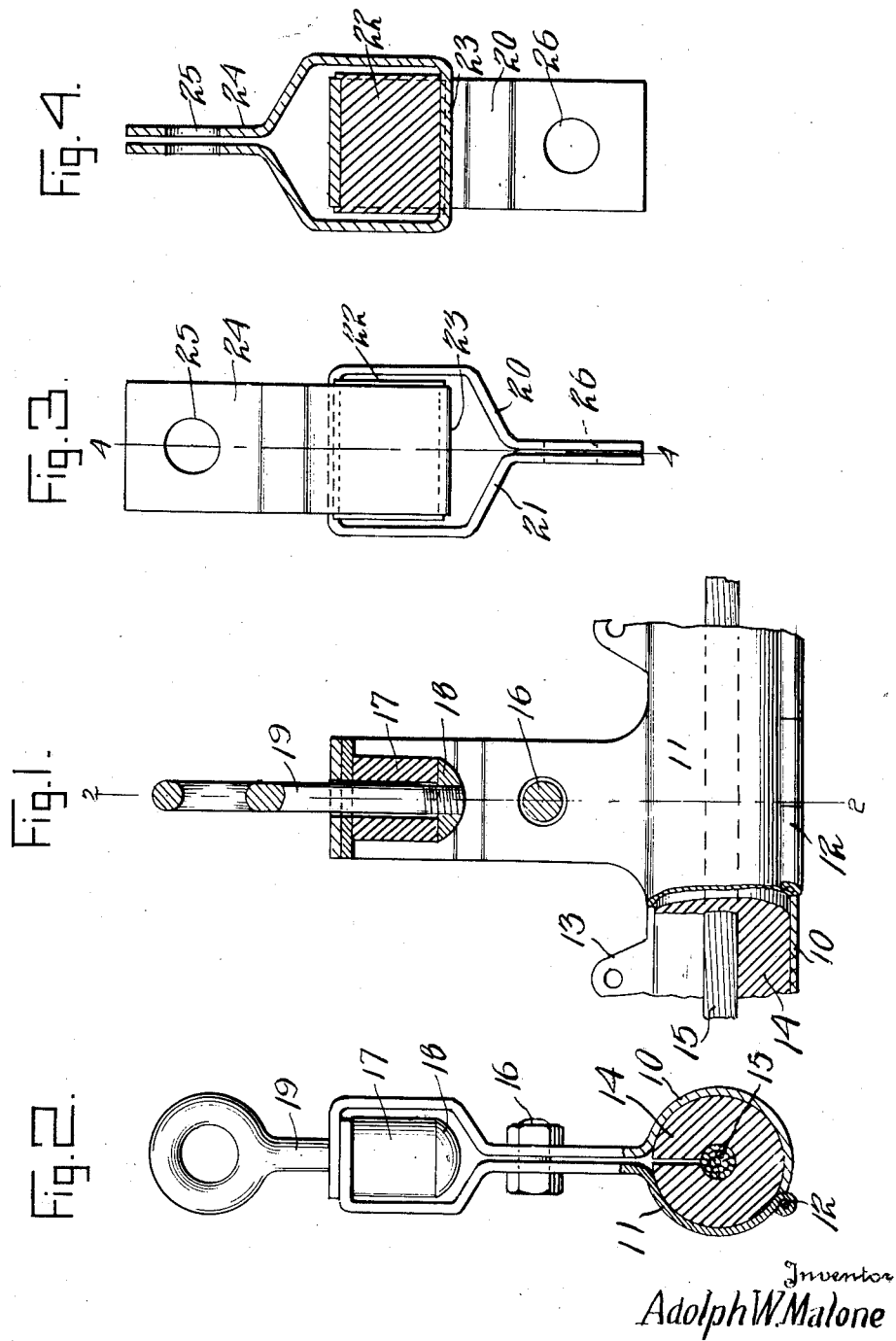
Inventor
Adolph W. Malone Patented Oct. 10, 1933

1,929,700

UNITED STATES PATENT OFFICE 1,929,700

BRACKET FOR RESILIENTLY SUPPORTING ELECTRIC CABLES

Adolph W. Malone, Fillmore, Utah, assignor of one-half to Albert H. Vestal, Anderson, Ind.

Application November 14, 1931
Serial No. 575,129

1 Claim. (Cl. 248—31)

This invention relates to supporting means for electric transmission cables and its object is to provide resilient means in connection with the supports which will eliminate breaking of the cables as a result of crystallization of the metal due to vibration of the wires.

A further object is to provide attaching brackets for resilient cable supports.

Referring to the accompanying drawing which is made a part hereof and on which similar reference characters indicate similar parts, Figure 1 is a view in side elevation of a cable support, Figure 2, a section on line 2—2 of Figure 1, Figure 3, a view in side elevation of a bracket for supporting cable supports, and Figure 4, a section on line 4—4 of Figure 1.

The supporting device shown in Figures 1 and 2 is an improvement over that shown in my co-pending application Ser. No. 575,127 filed of even date herewith.

The invention in this case provides additional resilient means for cushioning vibration of the electric cable.

In the drawing numerals 10 and 11 indicate sections of a cable support which sections are hinged at 12 and may be secured together by bolts passing through lugs 13. A sleeve 14 of resilient material is placed around the electric cable 15. Elongated lugs on the sections of the supporting bracket are brought together and secured by means of a bolt 16. The upper ends of these lugs engage over the top of a resilient washer 17 which rests upon the head 18 of the supporting link 19 which link may be attached to insulating supports on a fixed support, such insulators usually being carried on cross arms of supporting poles or towers such as are common in high tension transmission lines. The rubber sleeve or core 14 provides a resilient support for the cable which tends to prevent crystallizing of the metal of the cable due to the vibration of the cable caused by the wind. The elongated resilient washer 17 provides an additional shock absorber for the cable.

In Figures 3 and 4 is shown a modified form of bracket for supporting such cable supports as those shown in my co-pending application Ser. No. 575,127 filed of even date herewith. This support consists of a pair of brackets 20 and 21, the upper ends of which fit over the top of a resilient plug 22, the lower end of which rests upon the lower portion of an additional supporting bracket 24. The bracket 24 is provided with an eye 25 by means of which it is secured to the usual supporting bracket, lug or link which depends from an insulator not shown. The brackets 20, 21 are provided with an opening 26 by means of which they are attached to an eye in a supporting element such as that shown in the co-pending application referred to. As will be apparent, the form shown in Figures 3 and 4 provides an additional shock absorber or resilient support between the cable and the fixed rigid support.

It will be obvious to those skilled in the art that various changes may be made in my device without departing from the spirit of the invention and therefore I do not limit myself to what is shown in the drawing and described in the specification, but only as indicated by the appended claim.

Having thus fully described my said invention, what I claim as new and desire to secure by Letters Patent, is:

A support for a cable comprising a two-part hinged casing surrounding and supporting said cable and having the free ends of said parts formed into vertical plates, said plates being bent outwardly at their centers, then continuing vertically, the ends of said plates being bent horizontally toward and overlapping each other, said ends being provided with perforations therethrough, and a link extending through said perforations having a resilient plug secured thereon and positioned beneath said overlapping ends in the recess formed between said plates for supporting said casing, substantially as set forth.

ADOLPH W. MALONE.